US 012041145B2

(12) United States Patent
Lowe et al.

(10) Patent No.: US 12,041,145 B2
(45) Date of Patent: *Jul. 16, 2024

(54) EDGE COMMUNICATION LOCATIONS

(71) Applicant: Twilio Inc., San Francisco, CA (US)

(72) Inventors: Alexander Philip Lowe, Pacifica, CA (US); Madeleine Genevieve Muscari, Berkeley, CA (US); Robert Charles Hagemann, III, Potomac, MD (US); Christer Jan Erik Fahlgren, San Francisco, CA (US); Jeremy Andrew McEntire, San Francisco, CA (US); Erik A. Jansson, San Francisco, CA (US); Humberto Reyes, Berkeley, CA (US); Evan Kyle Fossier, San Francisco, CA (US); Jingming Niu, San Francisco, CA (US)

(73) Assignee: Twilio Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/105,048

(22) Filed: Feb. 2, 2023

(65) Prior Publication Data
US 2023/0179678 A1 Jun. 8, 2023

Related U.S. Application Data

(63) Continuation of application No. 16/991,481, filed on Aug. 12, 2020, now Pat. No. 11,601,519.
(Continued)

(51) Int. Cl.
H04L 67/563 (2022.01)
G06F 9/54 (2006.01)
(Continued)

(52) U.S. Cl.
CPC ............ *H04L 67/563* (2022.05); *G06F 9/541* (2013.01); *H04L 9/0838* (2013.01); *H04L 63/08* (2013.01);
(Continued)

(58) Field of Classification Search
CPC ..... H04L 67/563; H04L 63/08; H04L 63/166; H04L 67/02; H04L 67/141; H04L 67/2871; H04L 9/0838
See application file for complete search history.

(56) References Cited

U.S. PATENT DOCUMENTS

2004/0103283 A1 5/2004 Hornak
2008/0134311 A1 6/2008 Medvinsky et al.
(Continued)

FOREIGN PATENT DOCUMENTS

WO WO-2021252114 A1 12/2021

OTHER PUBLICATIONS

"U.S. Appl. No. 16/991,481, Examiner Interview Summary mailed Aug. 3, 2022", 2 pgs.
(Continued)

Primary Examiner — Esther B. Henderson
(74) Attorney, Agent, or Firm — Schwegman Lundberg & Woessner, P.A.

(57) ABSTRACT

Methods, systems, and computer programs are presented for lowering network latency for cloud-based services. Service-delivery edge locations allow customers to improve communication-providers public and private network connectivity for improved performance. One method includes operations for performing, by an edge server, a handshake to establish a communication session between a client and a main server, and for exchanging data between the client and the main server via the edge server. The handshake includes exchanging, by the edge server, communication initiation
(Continued)

messages with the client, and validating, by the edge server, authentication credentials for the communication session based on the communication initiation messages. The exchanging data comprises forwarding, by the edge server, data requests from the client to the main server through a private connection between the edge server and the main server, and forwarding, by the edge server, data responses from the main server to the client through the private connection.

20 Claims, 8 Drawing Sheets

Related U.S. Application Data

(60) Provisional application No. 63/036,720, filed on Jun. 9, 2020.

(51) Int. Cl.
    *H04L 9/08*      (2006.01)
    *H04L 9/40*      (2022.01)
    *H04L 67/02*      (2022.01)
    *H04L 67/141*      (2022.01)
    *H04L 67/2871*      (2022.01)

(52) U.S. Cl.
    CPC ............ *H04L 63/166* (2013.01); *H04L 67/02* (2013.01); *H04L 67/141* (2013.01); *H04L 67/2871* (2013.01); *H04L 63/0272* (2013.01)

(56) References Cited

U.S. PATENT DOCUMENTS

| | | | |
|---|---|---|---|
| 2014/0185801 A1* | 7/2014 | Wang | H04N 21/440245 380/200 |
| 2020/0351248 A1 | 11/2020 | Bonci | |
| 2021/0385292 A1 | 12/2021 | Lowe et al. | |

OTHER PUBLICATIONS

"U.S. Appl. No. 16/991,481, Non Final Office Action mailed May 10, 2022", 10 pgs.
"U.S. Appl. No. 16/991,481, Notice of Allowance mailed Nov. 15, 2022", 5 pgs.
"U.S. Appl. No. 16/991,481, Response filed Aug. 9, 2022 to Non Final Office Action mailed May 10, 2022", 10 pgs.
"International Application Serial No. PCT/US2021/031298, International Preliminary Report on Patentability mailed May 10, 2021", 6 pgs.
"International Application Serial No. PCT/US2021/031298, International Search Report mailed Aug. 23, 2021", 4 pgs.
"International Application Serial No. PCT/US2021/031298, Written Opinion mailed Aug. 23, 2021", 6 pgs.

\* cited by examiner

EDGE COMMUNICATION LOCATIONS

CLAIM OF PRIORITY

This application is a continuation of U.S. patent application Ser. No. 16/991,481, filed Aug. 12, 2020, and claims priority from U.S. Provisional Patent Application No. 63/036,720, filed Jun. 9, 2020, and entitled "Edge Communication Locations." These applications are herein incorporated by reference in their entireties.

TECHNICAL FIELD

The subject matter disclosed herein generally relates to methods, systems, and machine-readable storage media for improving telecom-service delivery speeds.

BACKGROUND

Some companies rely on the Internet as a communication media for implementing cloud-based services. However, relying on the Internet as the transport medium can result in periods of low-quality service delivery.

The Internet consists of formal and informal agreements among service providers and other institutions which forward traffic, normally with no particular guarantee of an end-to-end service level agreement (SLA). This works surprisingly well most times, until problems arise, such as poor or loss of network connectivity between customers and the service provider.

Network connectivity issues can take many forms: complete loss of connectivity (e.g., at Internet Protocol (IP) level), high latency (e.g., packets arrive much later than expected), packet losses, blocked ports or traffic types, and response variability (e.g., latency at some times can double or triple the latency during good times).

In particular, remote customers accessing servers in far-away locations (e.g., in a different continent) may experience long delays during connection establishment. These delays may be connection establishment procedures like the Transport Layer Security (TLS) handshake process that uses multiple exchanges between the client and the remote server.

What is needed are systems and methods to avoid network latency and provide a robust communications infrastructure.

BRIEF DESCRIPTION OF THE DRAWINGS

Various of the appended drawings merely illustrate example embodiments of the present disclosure and cannot be considered as limiting its scope.

DETAILED DESCRIPTION

Example methods, systems, and computer programs are directed to lowering network latency for cloud-based services. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Service-delivery edge locations provide customers improved security, performance, and resiliency for mission critical operations. The edge locations allow customers to improve communication-providers public and private network connectivity for improved performance.

When a customer application requests a new connection to a remote server, the Transport Layer Security (TLS) negotiation process is handled by a balancer Application Programming Interface (API) server which is geographically close to the customer application. This can shave off hundreds of milliseconds or more of the connection request time. In some examples, the balancer API is connected to the remote server through a private connection (e.g., using Amazon's virtual private cloud (VPC) cross-region peering (XRP), also referred to as inter-region VPC peering), which may be faster than sending information over the public internet, and is also more private and more reliable because the public Internet is subject to random shifts in quality.

The API functionality is divided between a regular API server hosted in a main location and the balancer API hosted at the edge location. The balancer API enables the remote applications to perform faster non-voice communication services, such as HTTP REST calls, WebSockets, and callbacks (e.g., webhooks).

One general aspect includes a method that includes operations for performing, by an edge server, a handshake to establish a communication session between a client and a main server, and for exchanging data between the client and the main server via the edge server. The handshake includes exchanging, by the edge server, communication initiation messages with the client, and validating, by the edge server, authentication credentials for the communication session based on the communication initiation messages. The exchanging data comprises forwarding, by the edge server, data requests from the client to the main server through a private connection between the edge server and the main server, and forwarding, by the edge server, data responses from the main server to the client through the private connection.

Figure 1:
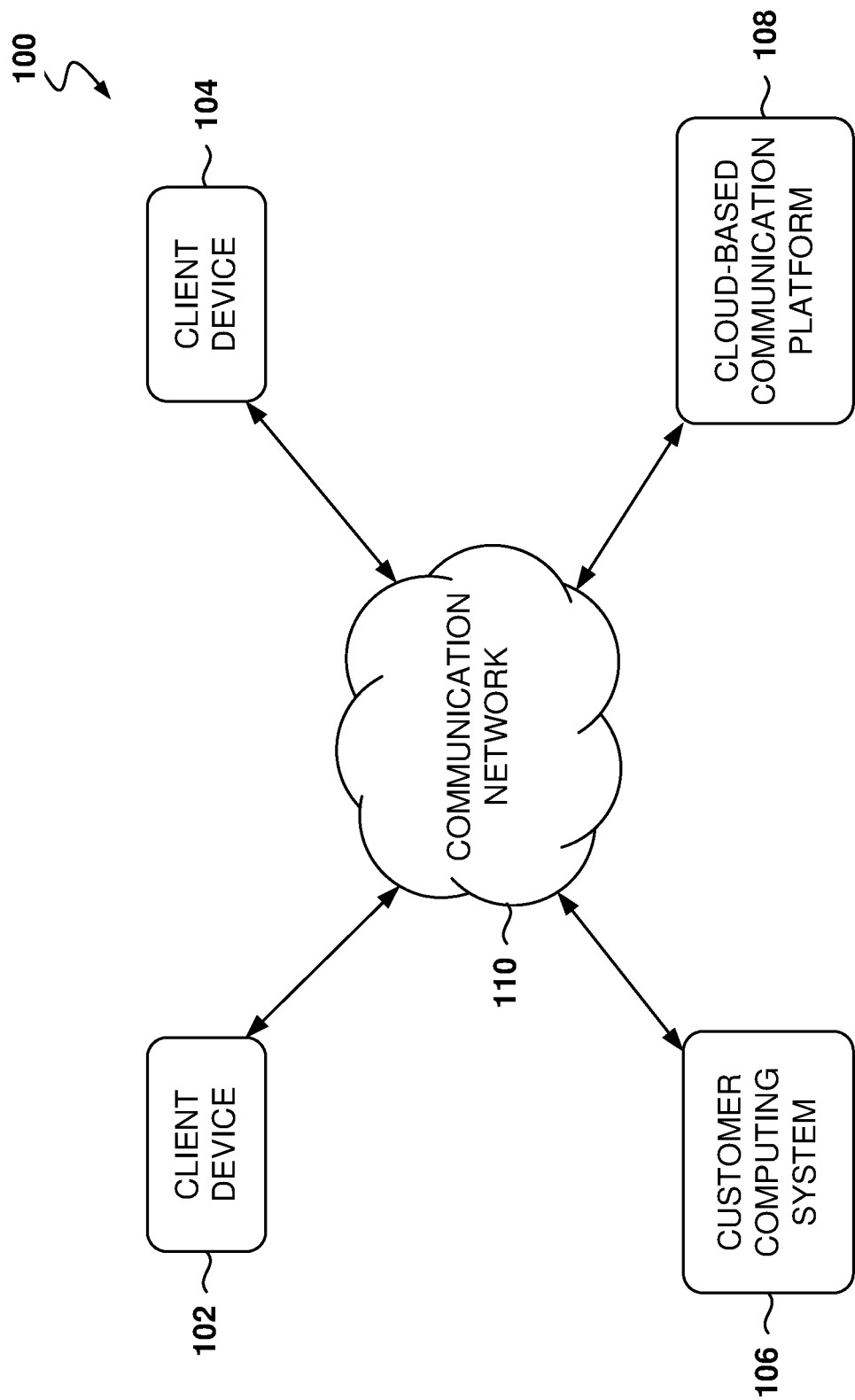
FIG. 1 is a diagram showing an example system for providing communication services, according to some example embodiments.

FIG. 1 shows an example system for providing communication services, according to some example embodiments. As shown, multiple devices (i.e., client device 102, client device 104, customer computing system 106, and cloud-based communication platform 108) are connected to a communication network 110 and configured to communicate with each other through use of the communication network 110. The communication network 110 is any type of network, including a local area network (LAN), such as an intranet, a wide area network (WAN), such as the internet, or any combination thereof. Further, the communication network 110 may be a public network, a private network, or a combination thereof. The communication network 110 is implemented using any number of communication links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet personal computer (PC).

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The customer computing system 106 is one or more computing devices associated with a customer of the cloud-based communication platform 108. A customer may be any type of a person, entity, business, or the like, that utilizes the communication functionality of the cloud-based communication platform. For example, a customer may be a bank, retail store, restaurant, and the like.

In some embodiments, a customer may provide an online service that may be accessed by users via the communication network 110. In this type of embodiments, the customer computing system 106 may facilitate functioning of the provided online service. For example, users may use the client devices 102 and 104 that are connected to the communication network 110 to interact with the customer computing system 106 and utilize the online service. The online service provided by the customer computing system 106 may be any type of service provided online, such as a ride-sharing service, reservation service, retail service, news service, etc.

Although the shown system 100 includes only two client devices 102, 104 and one customer computing system 106, this is only for ease of explanation and is not meant to be limiting. One skilled in the art would appreciate that the system 100 can include any number of client devices 102, 104 and/or customer computing systems 106. Further, the customer computing system 106 may concurrently accept connections from, and interact with, any number of client devices 102, 104. The customer computing system 106 supports connections from a variety of different types of client devices 102, 104, such as desktop computers; mobile computers; mobile communications devices, e.g., mobile phones, smart phones, tablets; smart televisions; set-top boxes; and/or any other network enabled computing devices.

A user interacts with the customer computing system 106 via a client-side application installed on the client devices 102 and 104. In some embodiments, the client-side application includes a component specific to the online service provided by the customer computing system 106. For example, the component may be a stand-alone application, one or more application plug-ins, and/or a browser extension. However, the users may also interact with the customer computing system 106 via a third-party application, such as a web browser, that resides on the client devices 102 and 104 and is configured to communicate with the online service provided by the customer computing system 106. In either case, the client-side application presents a user interface (UI) for the user to interact with the customer computing system 106 to utilize the provided online service. For example, the user interacts with the customer computing system 106 via a client-side application integrated with the file system or via a webpage displayed using a web browser application.

The cloud-based communication platform 108 provides communication services for multiple accounts of the cloud-based communication platform 108. Each account may be associated with a different customer of the cloud-based communication platform 108 (e.g., individual user, set of users, company, organization, online service, etc.). The cloud-based communication platform 108 may provide a variety of cloud-based communication services, such as facilitating communication sessions (e.g., phone calls, messaging, and the like) between endpoints (e.g., client devices), managing incoming communication requests, routing communication requests to an appropriate endpoint, logging data associated with communication sessions, etc. A communication session is any type of communication between two or more client devices 102, 104. For example, a communication session may be a synchronous communication session, such as a voice communication session (e.g., phone call), video communication session (e.g., video conference), and the like. A communication session may also be an asynchronous communication session, such as text communication, chat session, and the like.

The cloud-based communication platform 108 may allocate contact identifiers (e.g., phone numbers, URLs, and the like) to customers for use in facilitating communications. Communications directed to the contact identifiers are received and managed by the cloud-based communication platform 108 according to configurations selected by the customer. For example, the customer may designate an allocated contact identifier to a specific client device 102 causing communications directed to the contact identifier to be routed by the cloud-based communication platform 108 to its designated client device 102. As another example, the customer may designate an allocated contact identifier to a customer call center. As a result, the cloud-based communication platform 108 may route communications directed to the allocated endpoint to one of the customer's available call center agents.

The cloud-based communication platform 108 may also provide customers with an Application Programing Interface (API) that enables the customers to programmatically communicate with and utilize the functionality of the cloud-based communication platform 108. The API may include specific API commands to invoke specified functionality of the cloud-based communication platform 108. For example, the API may define the syntax and format for the API command, including the parameters to include in the API command to initiate the desired functionality, such as initiating a communication session (e.g., phone call, chat session), transmitting an email message, and the like.

A customer may use the API to directly communicate with the communication services provided by the cloud-based communication platform 108. For example, a customer may use the API to transmit API commands from the customer computing system 106 to the cloud-based communication platform 108 to cause performance of specified functionality, such as initiating a communication session, transmitting an email, and the like.

A customer may also use the API provided by the cloud-based communication platform 108 to incorporate the communication services provided by the cloud-based communication platform 108 into the customer's application or website. For example, the customer may include API commands from the API into the source code of the programming application and/or website to cause the application and/or website to communicate with the cloud-based communication platform 108 to provide communication services provided by the cloud-based communication platform 108.

As an example, a customer that provides an online service such as a ride sharing application may utilize the communication services provided by the cloud-based communication platform 108 to enable users and drivers of the ride sharing application to communicate with each other. For example, the ride sharing application may include a user interface element that may be selected by a user to initiate a communication session with their driver. Selection of the user interface element may cause the customer computing system 106 to transmit an API command to the cloud-based communication platform 108 to initiate a communication session between client devices 102, 104 of the user and driver. Similarly, a customer that provides a dating application may utilize the communication services provided by the cloud-based communication platform 108 to enable users of the dating application to communicate with each other.

Users of the application may not have knowledge that the communication services they are using through the application are being facilitated by the cloud-based communication platform 108. That is, the communication services may be presented as being a part of the application itself rather than provided by the cloud-based communication platform 108. In this way, the communication services facilitated by the cloud-based communication platform 108 are provided as a SaaS.

The cloud-based communication platform 108 enables customers to configure performance of the communication services provided by the cloud-based communication platform 108. For example, the cloud-based communication platform 108 allows its customers to configure a set of communication instructions dictating actions to be performed by the cloud-based communication platform 108 in response to receiving an incoming communication associated with the customer. The set of communication instructions may include individual commands that dictate the actions to be performed by the cloud-based communication platform 108. For example, a customer may provide a set of communication instructions dictating actions to be performed by the cloud-based communication platform 108 in response to receiving an incoming communication request (e.g., incoming call) directed to a contact identifier (e.g., phone number) allocated to the customer's account, such as directing the incoming communication to a specified client device 102.

The set of communication instructions may be a programming script that the cloud-based communication platform 108 executes to perform the functionality desired by the customer. The programming script may be written in a scripting language (e.g., TwiML) provided by the cloud-based communication platform 108 for use by its customers. For example, the scripting language may include specific commands for invoking a set of features and functionality provided by the cloud-based communication platform 108. Accordingly, a customer of the cloud-based communication platform 108 uses the scripting language to generate a set of communication instructions to cause the cloud-based communication platform 108 to perform the specified actions desired by the customer, such as connecting an incoming communication to a specified destination client device 102, invoking a feature provided by the cloud-based communication platform 108, and the like.

In some embodiments, the set of communication instructions may be provided to the cloud-based communication platform 108 along with an incoming communication, such as an incoming communication request received from a customer computing system 106. As another example, a customer may upload a set of communication instructions to the cloud-based communication platform 108 to be associated with the customer's account and/or specific endpoint identifiers allocated to the customer. As another example, the customer may provide the cloud-based communication platform 108 with a resource identifier (e.g., Uniform Resource Identifier (URI)) that identifies a network location of the set of communication instructions.

In any case, the cloud-based communication platform 108 accesses a set of communication instructions associated with an incoming communication request and executes the set of communication instructions to provide the functionality desired by the customer. In this way, the cloud-based communication platform 108 allows for customization of the features and functionality it provides to its customers. For example, a customer may configure the set of communication instructions as desired to leverage the desired features and functionality provided by the cloud-based communication platform 108. Accordingly, the communication services provided by the cloud-based communication platform 108 to each customer may vary based on each customer's specific needs.

In some example embodiments, the cloud-based communication platform 108 utilizes Global Low Latency (GLL) routing capabilities to determine which data center is closest to the client device 102, establishing a connection through the nearest point of presence. GLL uses latency-based Domain Name Service (DNS) lookups to determine the nearest data center. However, the client device 102 can override the default setting, especially when a user is working from a fixed location and using a DNS server in another region.

Figure 2:
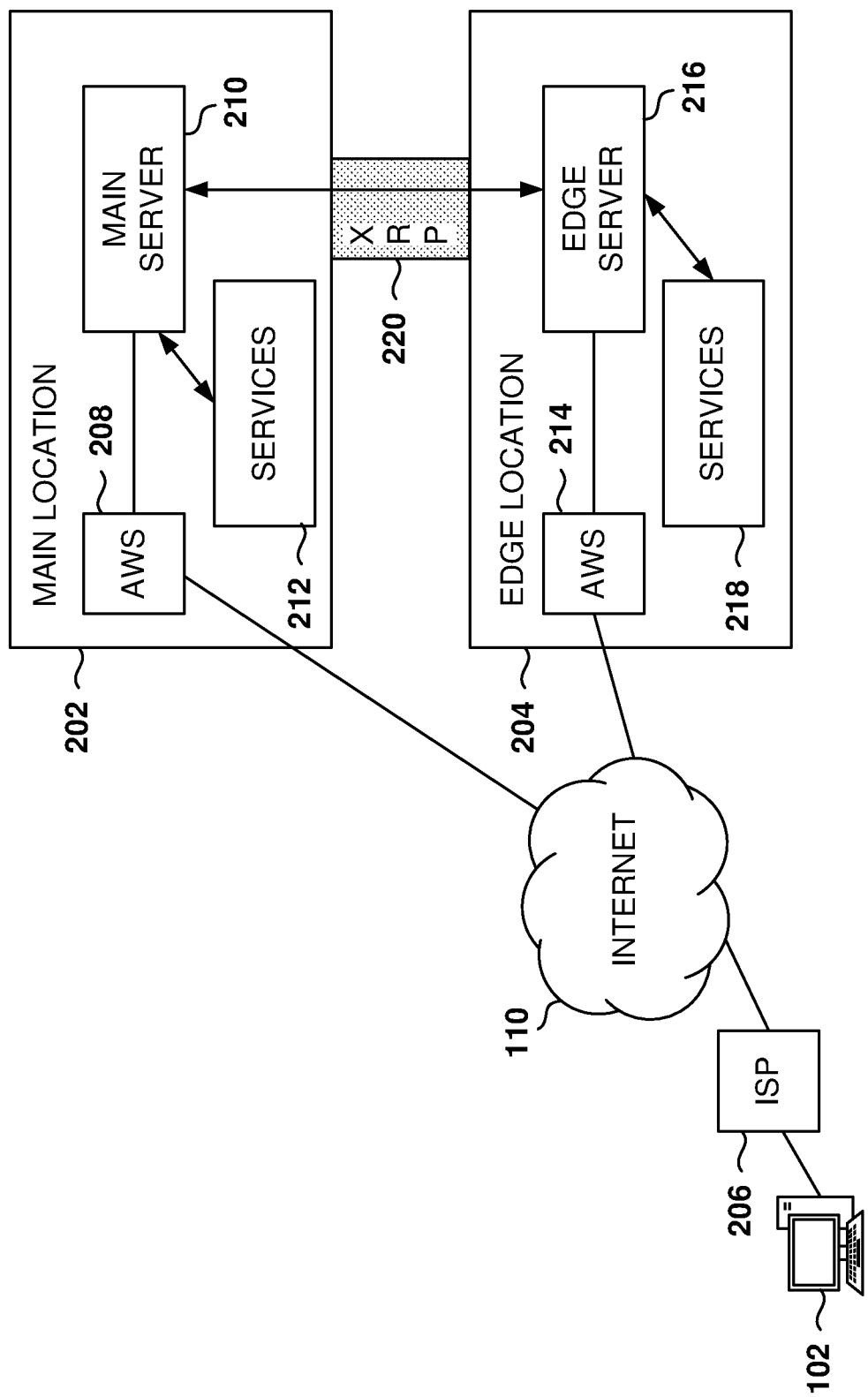
FIG. 2 is a block diagram illustrating a sample architecture for service delivery utilizing resources at multiple locations, according to some example embodiments.

FIG. 2 illustrates a sample architecture for service delivery utilizing resources at multiple locations, according to some example embodiments. The main location 202 is the place where services 212 are managed and coordinated. The edge location 204 is a place that is closer to the client device 102. For example, the edge location 204 and the client device 102 are in the same continent, while the main location 202 is in a different continent. There could also be multiple edge locations 204 in the same continent, but they are typically separated by large distances (e.g., thousands of kilometers). In some example embodiments, the main location 202 may be co-located with one of the edge locations 204 that serves the geography where the main location 202 is situated (e.g., same country where the main location 202 is located).

The main location 202 includes on-premise outposts of cloud platform services (e.g., Amazon Web Services (AWS)) 208, a main server 210, and services 212, which includes one or more service-delivery modules. Embodiments are presented with reference to AWS but the same principles may be utilized with other cloud platforms.

The edge location 204 includes on premise outposts of cloud platform services (e.g., AWS) 214, edge server 216, and services 218. The client device may access services 212 in the main location 202 and services 218 in the edge location 204.

Having AWS 214 at the edge location 204 allows the client devices 102 to be closer to a services location, which means less exposure to communications that travel over the communication network 110. In some example embodiments, "closer" means that the client device is more proximate to the service location than to the main location. In other example embodiments, "closer" means that the network latency to communicate between the client device and the edge location is lower than the network latency to communicate between the client device and the main location. In some cases, the client device is closer, both physically and connectivity-wise, to the edge location than the main location.

The edge location 204 provides developers control over how ingress and egress traffic routes through the service-provider network.

In some example embodiments, the services 218 and 212 include communication services, such as voice, video, Short Message Service (SMS), Multimedia Messaging Service (MMS), email delivery, etc., and the access to these communication services may be through API access, WebSocket, callbacks, etc. In some cases, some of the services may be offered in one location, but not in the other, so the client device 102 has to access services 212 for some communication requests.

In some example embodiments, the client device 102 accesses the edge location 204 or the main location 202 via the communication network 110 (e.g., the Internet), typically through an Internet Service Provider (ISP) 206. In other example embodiments, the client device 102 may also get access through a private connection to the edge location 204 or the main location 202. For example, the connection may be Virtual Private Network (VPN) over the internet, or a cross connect when the client device 102 is in the same facility as the edge location 204. The connection can also be a network cable wired connection to the edge server 216, an MPLS circuit, a carrier-provided private LAN, or other type of connectivity within the data center.

In some example embodiments, the main location 202 and the edge location 204 are interconnected via XRP 220, a virtual private cloud (VPC) service offered by Amazon.com, Inc. In other example embodiments, the main location 202 and the edge location 204 are interconnected via the Internet or through some other cross-region peering method.

A VPC XRP peering connection is a networking connection between two VPCs that enables routing traffic between the VPCs using private IPv4 addresses or IPv6 addresses. Each VPC can communicate with the other as if they are within the same network. The VPCs can be in the same region or in different regions (also known as an inter-region VPC peering connection).

The XRP peering relationships are established between VPCs across different AWS regions to transfer data. For example, a user may utilize a VPC XRP 220 connection to allow other VPCs to access resources in one of the VPCs. This allows different locations to communicate with each other using private IP addresses, without requiring gateways, Virtual Private Network (VPN) connections, or separate network appliances. The traffic remains in the private IP space, and inter-region traffic is encrypted with no single point of failure, or bandwidth bottleneck. Traffic stays on the AWS backbone, and never traverses the public internet, which reduces threats, such as common exploits, and Distributed Denial of Service (DDoS) attacks.

In some example embodiments, to make the API regionally available, the DNS requests have to be resolved to public IP addresses that are hosted in a region's edge location 204. As API requests arrive at the edge location 204, the API requests are forwarded to the corresponding API endpoint in the main location 202.

In some example embodiments, application developers have control over how requests are routed by the system by specifying the edge location for ingress and the region for processing the request. In some example embodiments, the location may be provided utilizing a hostname convention. In some example embodiments, the format for the hostname has the following syntax:

{service}.{edge-location}.{region}.servprovider.com

In this hostname, {service} refers to the service being accessed (e.g., API access), {edge-location} is the identifier for the edge location (e.g., dublin for edge location in Dublin, Ireland), {region} refers to the identifier of the region to serve the service request (e.g., de1 for Germany), and servprovider.com is the domain name of the service provider.

For example, a developer in Ireland that wants their application to use the API to access the service and have optimal connectivity to the Germany Region for improved latency and data locality will address the API as, "api.dublin.de1.servprovider.com". In another example, a developer in Australia that wants to access the edge location in Sydney for service provided in the US region may use the call, "api.sydney.us1.servprovider.com". If a developer uses a private connection to the service provider, the name of the edge location is different. For example, "sydney-IS" may be used for the private location, and the API call will be, "api.sydney-IS.au1.servprovider.com".

An example of the API call to "api.sydney.us1.servprovider.com", for a voice call, is as follows:

curl -X POST https://api.dublin.us1.servprovider.com/
       2010-04-01/Accounts/ACXXXXXXXXX/Calls.json \
    --data-urlencode "Url=http://demo.servprovider.com/
       docs/voice.xml" \
    --data-urlencode "To=+15551234567" \
    --data-urlencode "From=+15017654321" \
    -u ACXXXXXXXXX:your_auth_token If a request for the main location 202 arrives at the edge server 216 in the edge location 204, the edge server 216 forwards the request through the private XRP 220 connection; therefore, the request is not subject to the service fluctuations of Internet connections.

Without the edge location 204, the client device 102 would go directly to the main location 202 through the Internet 110, which may suffer connection problems, and longer delays, such as when establishing a connection to the services 212. If the two locations are far apart, such as Australia and United States, there can be Internet outages between the two continents, with the consequent degradation or unavailability of service.

In some example embodiments, a handshake is performed between the client and a server in preparation for communications, e.g., handshakes for TLS and WebSocket. The purpose of the handshake is to confirm establishment of the connection and exchange connection parameters, such as encryption keys.

Transport Layer Security (TLS) is a security protocol designed to facilitate privacy and data security for communications over the Internet. In example embodiments, TLS may be used for encrypting the communication between web applications and servers, such as web browsers loading a website. TLS may also be used to encrypt communications such as email, messaging, and voice over IP (VOIP). In some example embodiments, the TLS handshake for an API request to the services 212 in the main location 202 is handled by the edge location 204, which speeds up considerably the setup time. More details about the TLS handshake are provided below with reference to FIGS. 3 and 4.

The edge location 204 provides access to multiple services 218, including APIs for accessing these services, which include one or more of callbacks/webhooks, voice (e.g., elastic SIP Trunking, SIP Interface, and client/WebRTC), video, and messaging (e.g., SMS & Twilio Notify).

In some example embodiments, persistent IP-stream connections are established between the edge location and the main location for HTTP-mode traffic, such as Transmission Control Protocol (TCP) connections, UDP-based QUIC protocol connections, etc. Having local TCP handshake, combined with eliminating the cross-region TCP handshake on the backend, is a benefit of routing over the edge location 204 to speed up communications.

Figure 3:
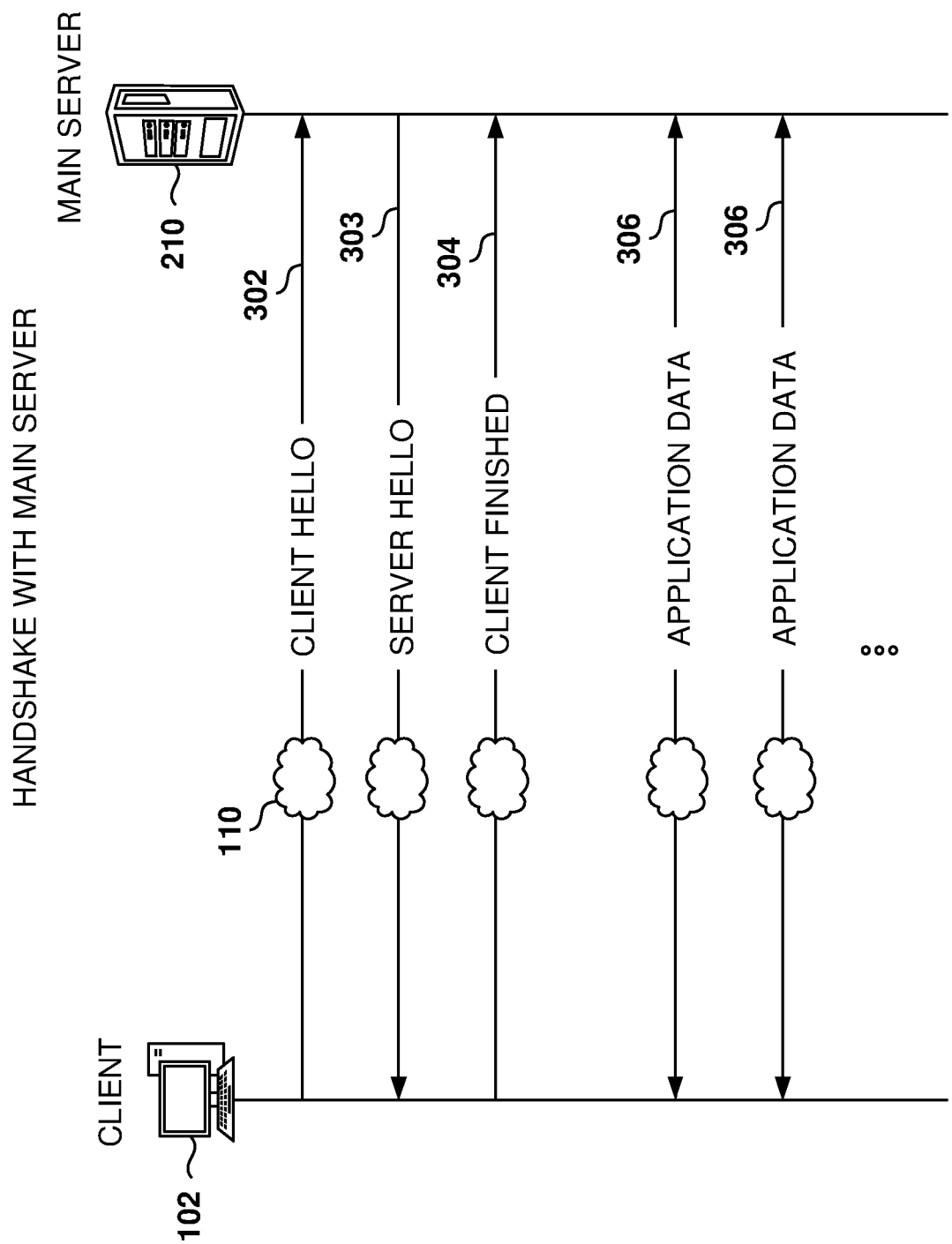
FIG. 3 is a diagram illustrating the handshake process between the client and the main server, according to some example embodiments.

FIG. 3 illustrates the handshake process between the client and the main server, according to some example embodiments. In the illustrated example, the client device 102 accesses the main server 210 without using the edge cloud location, and the communications travel through the Internet 110.

A Hypertext Transfer Protocol Secure (HTTPS) connection involves two parties: the client device 102 (who initiates the connection, e.g., a web browser) and the server. The purpose of the TLS handshake is to perform all the cryptographic work needed to have a secure connection. This includes authenticating the SSL certificate being used and generating an encryption key. It is noted that there are multiple versions of TLS in use (e.g., v 1.2, v 1.3) and the embodiments presented herein may be used with any of the TLS versions.

The TLS handshake is the name for the process that establishes an HTTPS connection. The TLS handshake version 1.3 is used to exchange encryption capabilities, authenticate the SSL certificate, and exchange a session key. The TLS handshake accomplishes 3 main things: exchanging cipher suites and parameters, authenticating one or both parties, and exchanging symmetric session keys.

A client-hello message 302 starts the handshake, and the client device 102 provides the supported cipher suites, guesses a key-agreement protocol and shares the client's encryption key.

The main server 210 spawns with a server-hello message 303 that sends confirmation of the key-agreement protocol, shares the session key, and ends with a server finished message.

The client device 102 authenticates the SSL certificate and uses the two key shares to calculate its own copy of the session key. When this is complete, the client device 102 sends a client-finished message 304 to the server 210.

When the client device 102 and the main server 210 are far apart, the messages may take a long time to be transmitted, e.g., over a configurable threshold associated with a pathway, such as 200 ms from Australia to the United States. In this case, if the messages have a 200 ms average transmission time, the TLS handshake may use 600 ms for the transmission of the messages. It is noted that the TLS handshake version 1.2 uses seven messages, so the communications delay will be even bigger.

Figure 4:
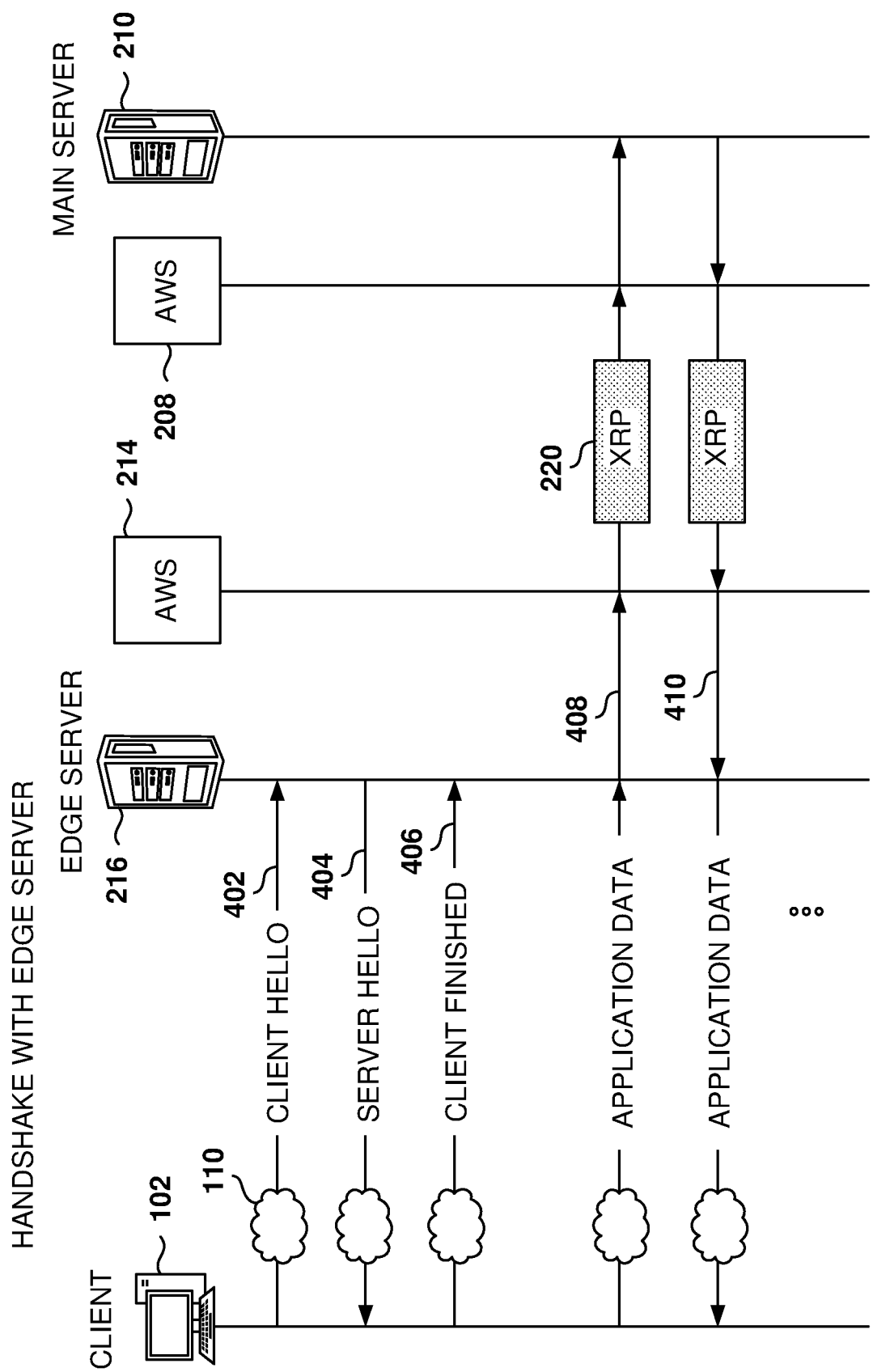
FIG. 4 is a diagram illustrating the handshake process with an edge server, according to some example embodiments.

FIG. 4 illustrates the handshake process with an edge server 216, according to some example embodiments. In the illustrated example, the client device 102 wants to submit API requests to access services at the main server 210, and the TLS handshake is performed with the edge server 216, instead of the main server 210. This way, the edge server 216 validates the authentication credentials for the session.

The client-hello message 402 is sent to the edge server 216. The edge server 216 then replies with the server-hello message 404. To finish the TLS handshake, the client device 102 sends the client-finished message 406 to the edge server 216. At this point, the client device 102 is ready to send HTTPS requests via the API to the main server 210.

In the illustrated example, the messages 402, 404, and 406 are sent via the Internet 110, but other connections may be used, such as a direct connect, a private connection, an MPLS connection, an AWS connection, etc.

During the application data exchange, the client device 102 sends data requests (e.g., via API requests), in an application-data message 408, to the edge server 216, and the edge server 216 forwards the message, via AWS 214 and 208, to the main server 210. The server then replies with the data with application-data message 410. The edge server 216 and the main server 210 may negotiate their own cipher keys for communications. The cipher keys used for the communications between the edge server 216 and the main server 210 are different from encryption keys utilized for communications between the client device and the edge server 216 (e.g., cipher keys established during the handshake process.

During the TLS handshake, the latency is much smaller than in the scenario of FIG. 3 because the client device 102 is physically closer to the edge cloud location. For example, the message transmission time may be 20 ms, so the handshake-message communications take 30 ms, much less than the 600 ms that the direct TLS handshake with the main server 210.

In some example embodiment, the requests are processed via RESTful APIs. Representational state transfer (REST) is a software architectural style that defines a set of constraints to be used for creating Web services. The web services that conform to the REST architectural style, called RESTful Web services, provide interoperability between computer systems on the Internet. RESTful Web services allow the requesting systems to access and manipulate textual representations of Web resources by using a uniform and predefined set of stateless operations. A RESTful API is an application program interface (API) that uses HTTP requests to GET, PUT, POST and DELETE data.

Web service APIs that adhere to the REST architectural constraints are called RESTful APIs. HTTP-based RESTful APIs include a base URI (e.g., http://api.example.com/collection/), standard HTTP methods (e.g., GET, POST, PUT, PATCH and DELETE), and a media type that defines state transition data elements (e.g., Atom, microformats, application/vnd.collection+json). The current representation tells the client how to compose requests for transitions to all the next available application states. This could be as simple as a URI or as complex as a Java applet. In other example embodiments, WebSocket APIs may also be used. These WebSocket APIs can be public APIs.

REST technology is generally preferred over Simple Object Access Protocol (SOAP) technology because REST uses less bandwidth, making it more suitable for efficient internet usage.

Figure 5:
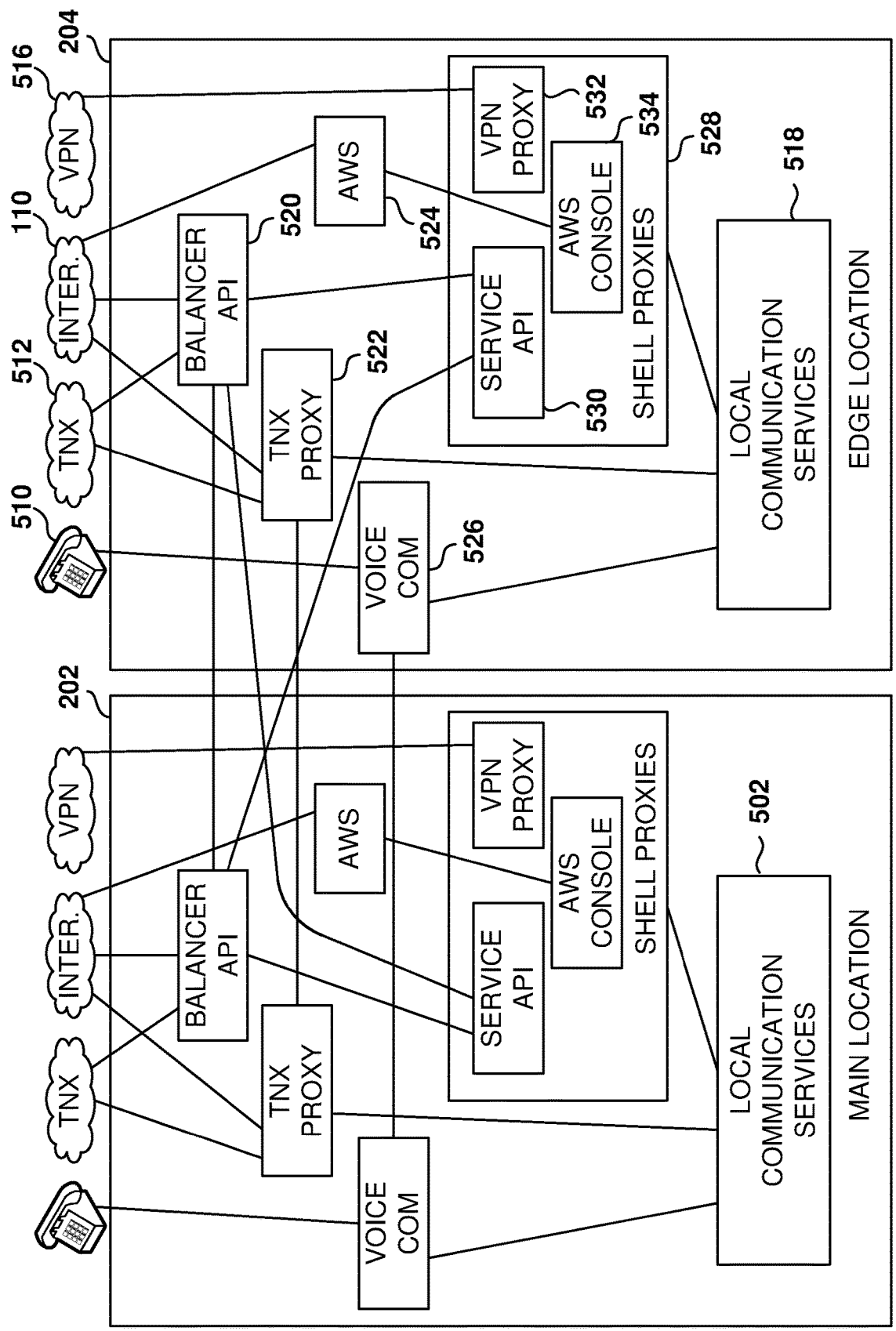
FIG. 5 is a block diagram showing a sample architecture for service delivery using edge locations, according to some example embodiments.

FIG. 5 is a sample architecture for service delivery using edge locations, according to some example embodiments. The main location 202 and the edge location 204 are accessible via phone network 510, Twilio Interconnect (TNX) 512, Internet 110, VPN 516, and other types of connections. TNX 512 is a private connection to the Twilio cloud via a network of physical points of presence co-located with physical infrastructure around the world through which customers exchange traffic among their networks and Twilio's cloud. With TNX, users establish physical or virtual connections to Twilio's infrastructure for private and secure communication traffic, improved network availability and quality of service, guaranteed throughput, and a consistent network experience compared to connections via the open Internet which inherently are best effort delivery with no quality or service guarantee. TNX 512 clients may connect to the SIP infrastructure using a private connection (e.g. MPLS, cross-connect) to a Twilio Elastic SIP Trunk, which is a cloud based solution that provides connectivity for IP-based communications infrastructure to connect to the PSTN, for making and receiving telephone calls via any broadband internet connection.

Table 1 below illustrates some of the connectivity options that may be provided:

TABLE 1

| Protocol | Use |
| --- | --- |
| REST API HTTP/HTTPS | Public REST APIs (HTTP/HTTPS Webhooks) Exists under several DNS names |
| Websockets | Public Websocket endpoints |
| SIP over UDP (public) | Public SIP endpoints for Voice stack |
| SIP over TLS (public) | Public SIP endpoints for Voice stack |
| SIP over UDP (carrier only) | Public IPs used for communication with carriers |
| SIP over Websocket | Used by Programmable Video to connect from JS stack. Mobile goes over SIP. |
| Programmable Voice Client (PSTREAM over Websocket) | Signaling for the Programmable Voice SDKs |
| RTP/SRTP/DTLS over UDP | Media for Voice and Video stack. IP-addresses negotiated using SDP conveyed in SIP/PSTREAM |

A balancer API 520 performs load balancing for API service requests and directs the request to the appropriate service API, such as the service API 530 that is part of the shell proxies 527, which also include the VPN proxy 532, and the AWS console 534). The VPN proxy handles requests arriving via the VPN 516 connection, and the AWS console 534 provides an interface for configuring AWS interactions and services. The TLS traffic is handled by the balancer API 520, such as the TLS handshake illustrated in FIG. 4.

The XRP 220 connection is established between the balancer API 520 and the balancer API at the main location 202. The balancer API 520 may also send requests to the service API in the main location 202. Additionally, the balancer API in the main location 202 may send API requests to the edge location 204. The balancer API 520 includes a layer-4 AWS load balancer. Similarly, the balancer API in the main location 202 may forward requests to the appropriate service API in the main location or in another edge location.

It is noted that although one edge location and one main location are illustrated in FIG. 5, other embodiments may include additional edge locations.

The edge location 204 further includes a TNX proxy 522 to handle TNX requests, a voice communications module 526 that handles voice requests, an AWS handler that interconnects to the AWS cloud service, and other local communication services 518.

When the TLS handshake request arrives at the balancer API 520, the balancer API 520 handles the TLS handshake. After the TLS handshake is established, during data transmission, the balancer API 520 determines the routing of the data request to the appropriate service API based on the host name in the request.

The service API 530 performs user authentication and then sends off requests to the appropriate service(s). For example, a messaging API call or a voice API call are routed by the service API 530. All that routing may be handled at a configurable routing layer.

Figure 6:
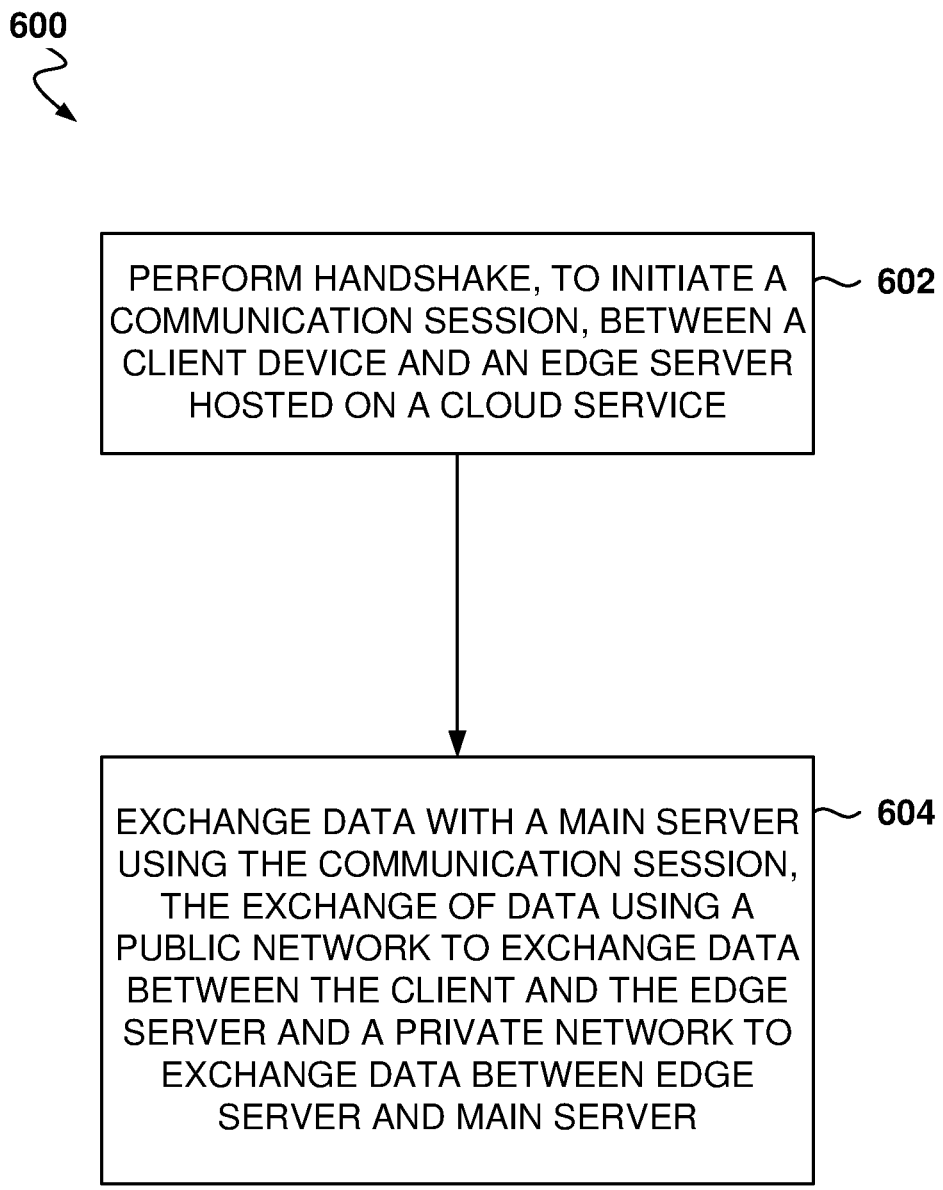
FIG. 6 is a flowchart of a method for lowering network latency for cloud-based services, according to some example embodiments.

FIG. 6 is a flowchart of a method 600 for delivering telecommunication services, according to some example embodiments. While the various operations in this flowchart are presented and described sequentially, one of ordinary skill will appreciate that some or all of the operations may be executed in a different order, be combined or omitted, or be executed in parallel.

At operation 602, a handshake is performed, between the client device and the edge server that is hosted on a cloud service, to initiate a communication session, as described herein.

From operation 602, the method flows to operation 604 for exchanging data with the main server using the communication session. The exchange of data utilizes a public network to exchange data between the client and the edge server, and a private network connection to exchange data between the edge server and the main server, as described herein.

Figure 7:
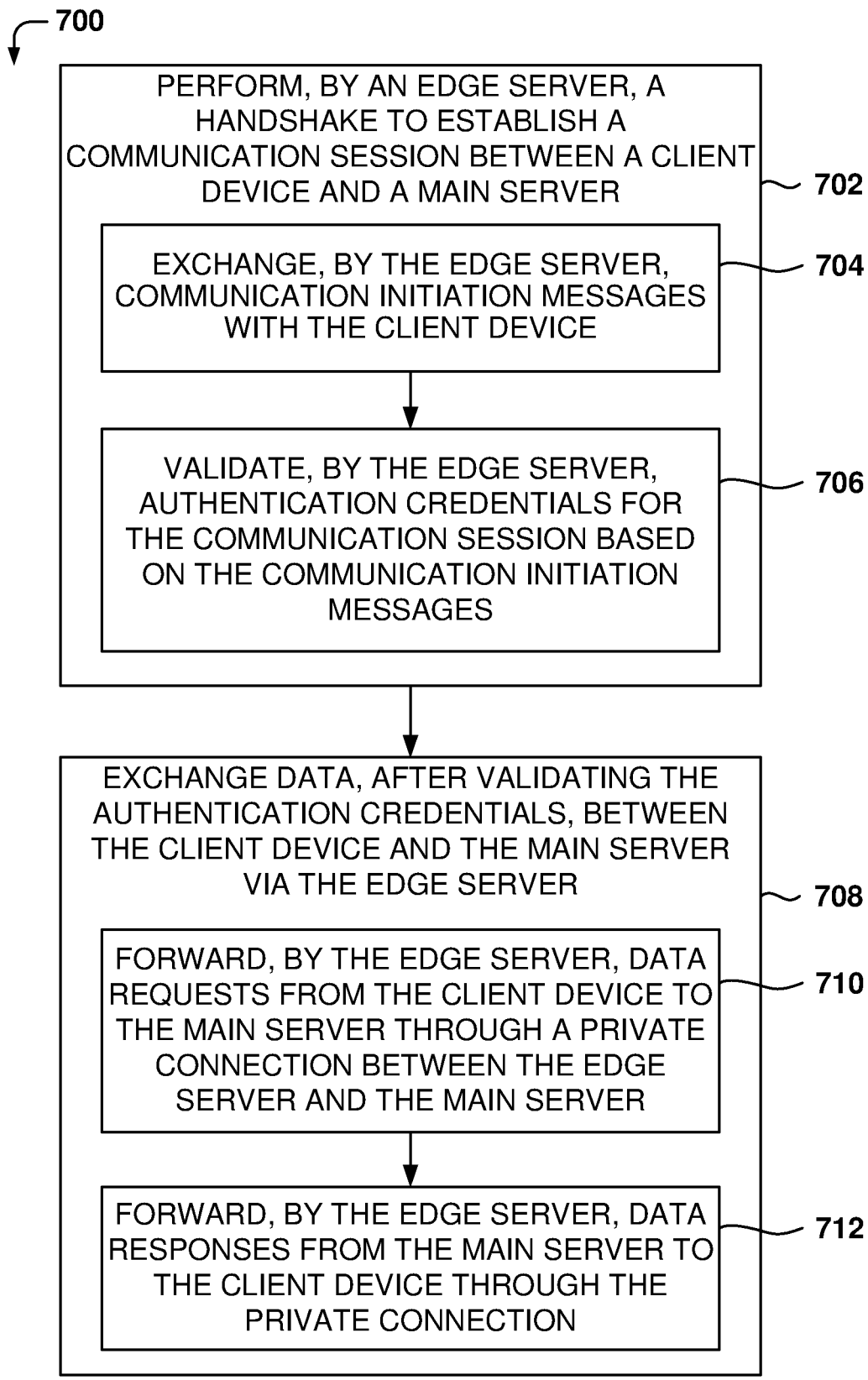
FIG. 7 is a flowchart of a method for establishing communications between a client and a server, according to some example embodiment.

FIG. 7 is a flowchart of a method 700 for establishing communications between a client and a server, according to some example embodiment. While the various operations in this flowchart are presented and described sequentially, one of ordinary skill will appreciate that some or all of the operations may be executed in a different order, be combined or omitted, or be executed in parallel.

At operation 702, the edge server performs a handshake to establish a communication session between a client device and a main server. The handshake includes operations 704 and 706. In some example embodiments, the handshake is performed between the client device and the edge server without any interactions with the main server, e.g., the main server does not perform any operations related to the handshake for establishing the communication session; the edge server is able to perform the handshake independently from the main server.

At operation 704, the edge server exchanges communication initiation messages with the client device. At operation 706, the edge server validates authentication credentials for the communication session based on the communication initiation messages.

From operation 702, the method 700 flows to operation 708 for exchanging data, after validating the authentication credentials, between the client device and the main server via the edge server. Exchanging the data comprises operations 710 and 712.

At operation 710, the edge server forwards data requests from the client device to the main server through a private connection between the edge server and the main server. At operation 712, the edge server forwards data responses from the main server to the client device through the private connection.

In one example, the method 700 further comprises providing, by the edge server, an Application Programing Interface (API) for submitting requests associated with the communication session by the client device.

In one example, the edge server includes an edge server balancer API for managing API requests received by the edge server. Further, the edge server balancer API is configured to communicate with a main server balancer API for processing API service requests.

In one example, the API provides a hostname convention in API requests to specify an identifier of the edge server and an identifier of the main server.

In one example, the edge server and the main server 210 negotiate cipher keys for communications between the edge server and the main server. The cipher keys are different from encryption keys utilized for communications between the client device and the edge server.

In one example, the edge server provides access to services via any of API access, WebSocket, and callbacks, the services including voice, video delivery, Short Message Service (SMS), and email delivery.

In one example, the edge server determines routing of a data request, from the client device to a service module, based on a host name in the data request, the host name including an identifier of the service.

In one example, the method 700 further comprises establishing persistent Transmission Control Protocol (TCP) connections for HTTP-mode traffic between the edge server and the main server.

In one example, the handshake is a Transport Layer Security (TLS) handshake. Performing the handshake does not include exchanging messages between the edge server and the main server to complete the handshake.

In one example, the client device communicates to the edge server via the Internet, wherein the private connection between the edge server and the main server is inter-region virtual private cloud (VPC) peering.

Another general aspect is for an edge server having a memory comprising instructions and one or more computer processors. The instructions, when executed by the one or more computer processors, cause the edge server to perform operations comprising: performing a handshake to establish a communication session between a client device and a main server, the handshake comprising: exchanging communication initiation messages with the client device, and validating authentication credentials for the communication session based on the communication initiation messages; and exchanging data, after validating the authentication credentials, between the client device and the main server via the edge server, wherein exchanging data comprises forwarding data requests from the client device to the main server through a private connection between the edge server and the main server, and forwarding data responses from the main server to the client device through the private connection.

In yet another general aspect, a machine-readable storage medium (e.g., a non-transitory storage medium) includes instructions that, when executed by a machine, cause the machine to perform operations comprising: performing, by an edge server, a handshake to establish a communication session between a client device and a main server, the handshake comprising exchanging, by the edge server, communication initiation messages with the client device, and validating, by the edge server, authentication credentials for the communication session based on the communication initiation messages; and exchanging data, after validating the authentication credentials, between the client device and the main server via the edge server, wherein exchanging data comprises forwarding, by the edge server, data requests from the client device to the main server through a private connection between the edge server and the main server, and forwarding, by the edge server, data responses from the main server to the client device through the private connection.

Figure 8:
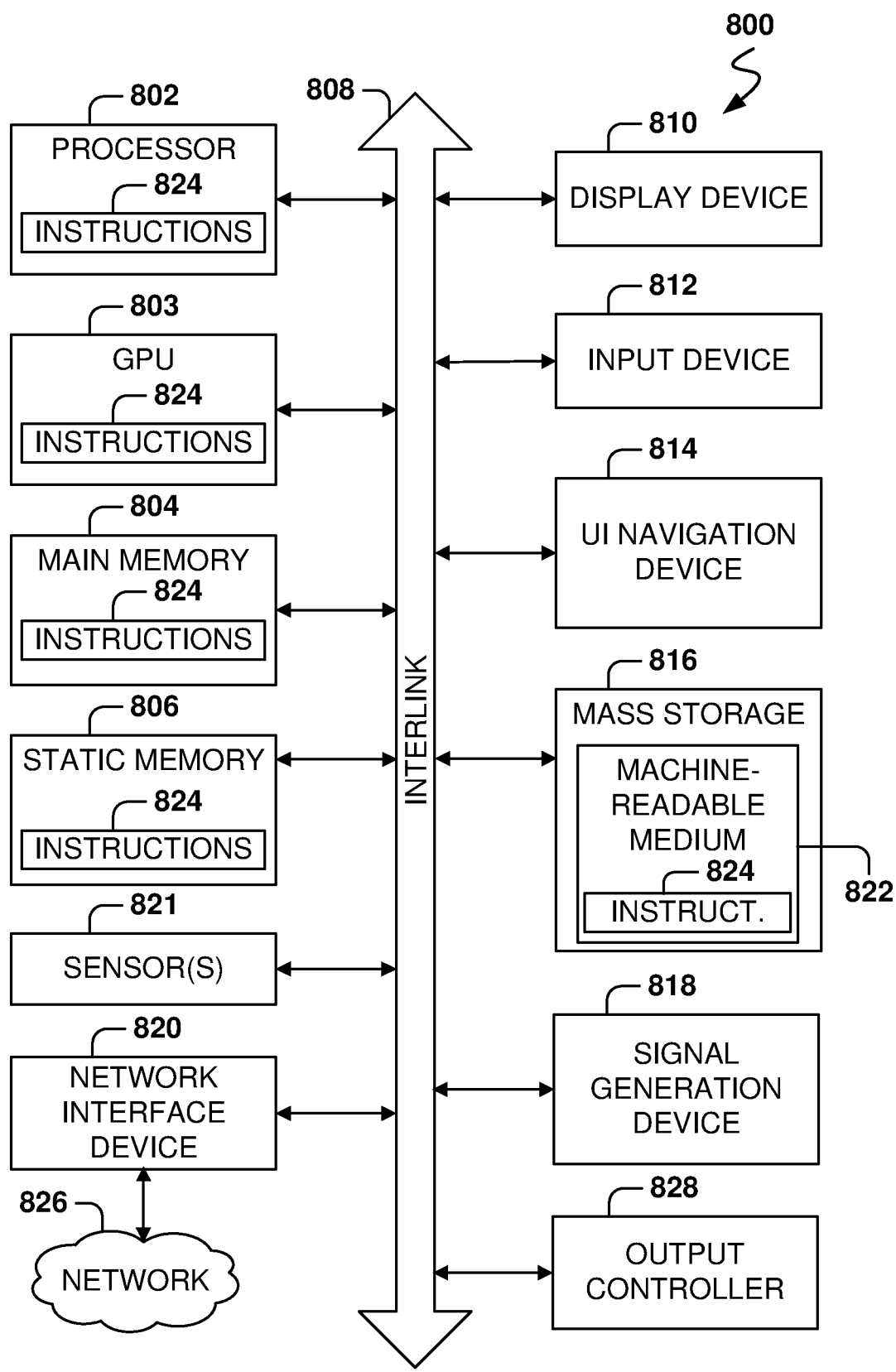
FIG. 8 is a block diagram illustrating an example of a machine upon or by which one or more example process embodiments described herein may be implemented or controlled.

FIG. 8 is a block diagram illustrating an example of a machine upon or by which one or more example process embodiments described herein may be implemented or controlled. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in a peer-to-peer (P2P) (or other distributed) network environment. Further, while only a single machine 800 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 800 may include a hardware processor 802 (e.g., a central processing unit (CPU), a hardware processor core, or any combination thereof), a graphics processing unit (GPU) 803, a main memory 804, and a static memory 806, some or all of which may communicate with each other via an interlink (e.g., bus) 808. The machine 800 may further include a display device 810, an alphanumeric input device 812 (e.g., a keyboard), and a user interface (UI) navigation device 814 (e.g., a mouse). In an example, the display device 810, alphanumeric input device 812, and UI navigation device 814 may be a touch screen display. The machine 800 may additionally include a mass storage device (e.g., drive unit) 816, a signal generation device 818 (e.g., a speaker), a network interface device 820, and one or more sensors 821, such as a Global Positioning System (GPS) sensor, compass, accelerometer, or another sensor. The machine 800 may include an output controller 828, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, within the hardware processor 802, or within the GPU 803 during execution thereof by the machine 800. In an example, one or any combination of the hardware processor 802, the GPU 803, the main memory 804, the static memory 806, or the mass storage device 816 may constitute machine-readable media.

While the machine-readable medium 822 is illustrated as a single medium, the term "machine-readable medium" may include a single medium, or multiple media, (e.g., a centralized or distributed database, and/or associated caches and servers) configured to store the one or more instructions 824.

The term "machine-readable medium" may include any medium that is capable of storing, encoding, or carrying instructions 824 for execution by the machine 800 and that cause the machine 800 to perform any one or more of the techniques of the present disclosure, or that is capable of storing, encoding, or carrying data structures used by or associated with such instructions 824. Non-limiting machine-readable medium examples may include solid-state memories, and optical and magnetic media. In an example, a massed machine-readable medium comprises a machine-readable medium 822 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820.

Throughout this specification, plural instances may implement components, operations, or structures described as a single instance. Although individual operations of one or more methods are illustrated and described as separate operations, one or more of the individual operations may be performed concurrently, and nothing would make use of the operations being performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    establishing, by one or more processors, a communication session between a client device and a main server, the establishing of the communication session comprising:
        determining, during a handshake process between an edge server and the client device, encryption keys for communications between the edge server and the client device;
        negotiating, outside the handshake process between the edge server and the client device, cipher keys for communications between the edge server and the main server, the cipher keys being different from the encryption keys determined during the handshake process between the edge server and the client device for communications between the edge server and the client device; and
    facilitating, by the one or more processors, the communication session between the client device and the main server, the facilitating of the communication session comprising:
        forwarding request data from the client device to the main server; and
        forwarding response data from the main server to the client device.

2. The method of claim 1, further comprising:
    generating the encryption keys for communications between the edge server and the client device, the encryption keys being different from the cipher keys for communications between the edge server and the main server.

3. The method of claim 1, further comprising:
providing an Application Programing Interface (API) according to which the client device is configured to submit the request data to the edge server.

4. The method of claim 1, further comprising:
providing an Application Programing Interface (API) according to which the edge server is configured to manage the request data received from the client device.

5. The method of claim 1, further comprising:
providing an Application Programing Interface (API) according to which the edge server is configured to perform the forwarding of the request data to the main server.

6. The method of claim 1, further comprising:
providing an Application Programing Interface (API) according to which the edge server is configured to receive the response data from the main server.

7. The method of claim 1, wherein:
the establishing of the communication session between the client device and the main server comprises establishing an internet connection between the edge server and the client device and establishing a private connection between the edge server and the main server.

8. A system comprising:
one or more processors; and
memory storing instructions that, when executed by the one or more processors, cause the system to perform operations comprising:
establishing a communication session between a client device and a main server, the establishing of the communication session comprising:
determining, during a handshake process between an edge server and the client device, encryption keys for communications between the edge server and the client device;
negotiating, outside the handshake process between the edge server and the client device, cipher keys for communications between the edge server and the main server, the cipher keys being different from the encryption keys determined during the handshake process between the edge server and the client device for communications between the edge server and the client device; and
facilitating the communication session between the client device and the main server, the facilitating of the communication session comprising:
forwarding request data from the client device to the main server; and
forwarding response data from the main server to the client device.

9. The system of claim 8, wherein the operations further comprise:
generating the encryption keys for communications between the edge server and the client device, the encryption keys being different from the cipher keys for communications between the edge server and the main server.

10. The system of claim 8, wherein the operations further comprise:
providing an Application Programing Interface (API) according to which the client device is configured to submit the request data to the edge server.

11. The system of claim 8, wherein the operations further comprise:
providing an Application Programing Interface (API) according to which the edge server is configured to manage the request data received from the client device.

12. The system of claim 8, wherein the operations further comprise:
providing an Application Programing Interface (API) according to which the edge server is configured to perform the forwarding of the request data to the main server.

13. The system of claim 8, wherein the operations further comprise:
providing an Application Programing Interface (API) according to which the edge server is configured to receive the response data from the main server.

14. The system of claim 8, wherein:
the establishing of the communication session between the client device and the main server comprises establishing an internet connection between the edge server and the client device and establishing a private connection between the edge server and the main server.

15. A non-transitory machine-readable medium storing instructions that, when executed by one or more processors, cause the one or more processors to perform operations comprising:
establishing a communication session between a client device and a main server, the establishing of the communication session comprising:
determining, during a handshake process between an edge server and the client device, encryption keys for communications between the edge server and the client device;
negotiating, outside the handshake process between the edge server and the client device, cipher keys for communications between the edge server and the main server, the cipher keys being different from the encryption keys determined during the handshake process between the edge server and the client device for communications between the edge server and the client device; and
facilitating the communication session between the client device and the main server, the facilitating of the communication session comprising:
forwarding request data from the client device to the main server; and
forwarding response data from the main server to the client device.

16. The non-transitory machine-readable medium of claim 15, wherein the operations further comprise:
generating the encryption keys for communications between the edge server and the client device, the encryption keys being different from the cipher keys for communications between the edge server and the main server.

17. The non-transitory machine-readable medium of claim 15, wherein the operations further comprise:
providing an Application Programing Interface (API) according to which the client device is configured to submit the request data to the edge server.

18. The non-transitory machine-readable medium of claim 15, wherein the operations further comprise:
providing an Application Programing Interface (API) according to which the edge server is configured to manage the request data received from the client device.

19. The non-transitory machine-readable medium of claim 15, wherein the operations further comprise:

providing an Application Programing Interface (API) according to which the edge server is configured to perform the forwarding of the request data to the main server.

20. The non-transitory machine-readable medium of claim 15, wherein the operations further comprise:

providing an Application Programing Interface (API) according to which the edge server is configured to receive the response data from the main server.

* * * * *